US012774532B2

(12) United States Patent
Kim et al.

(10) Patent No.: US 12,774,532 B2
(45) Date of Patent: Oct. 27, 2026

(54) METHOD FOR OPERATING WATER ELECTROLYSIS SYSTEM CAPABLE OF STABLY MAINTAINING QUALITY OF HYDROGEN

(71) Applicant: AcroLabs Inc., Seongnam-si (KR)

(72) Inventors: Ho Suk Kim, Seongnam-si (KR); Hyung Mok Cho, Gunpo-si (KR)

(73) Assignee: ACROLABS INC., Seongnam-si (KR)

( * ) Notice: Subject to any disclaimer, the term of this patent is extended or adjusted under 35 U.S.C. 154(b) by 491 days.

(21) Appl. No.: 18/543,563

(22) Filed: Dec. 18, 2023

(65) Prior Publication Data

US 2024/0218543 A1 Jul. 4, 2024

(30) Foreign Application Priority Data

Dec. 27, 2022 (KR) ........................ 10-2022-0185310

(51) Int. Cl.
*C25B 15/08* (2006.01)
*B01D 53/04* (2006.01)
(Continued)

(52) U.S. Cl.
CPC ........ *C25B 15/085* (2021.01); *B01D 53/0438* (2013.01); *B01D 53/0446* (2013.01);
(Continued)

(58) Field of Classification Search
CPC ....... C25B 15/085; C25B 1/04; C25B 15/021; C25B 15/029; C25B 15/02; C25B 15/08;
(Continued)

(56) References Cited

U.S. PATENT DOCUMENTS

2015/0337445 A1 * 11/2015 Hasegawa ................. C25B 1/04
204/278

FOREIGN PATENT DOCUMENTS

CN 107930344 B * 3/2024 ........... B01D 53/047
JP 2008144254 A * 6/2008
(Continued)

OTHER PUBLICATIONS

Machine Translation of JP-2014185387-A.*
(Continued)

*Primary Examiner* — Bryan D. Ripa
(74) *Attorney, Agent, or Firm* — Sughrue Mion, PLLC

(57) ABSTRACT

A method of operating a water electrolysis system including a water electrolysis stack discharging moisture-containing hydrogen gas, a plurality of dehumidification devices including a regenerative adsorbent removing moisture from the moisture-containing hydrogen gas discharged from the water electrolysis stack, temperature and pressure sensors detecting an internal temperature and pressure of each of the plurality of dehumidification devices, and a heating device heating the plurality of dehumidification devices, and in which the plurality of dehumidification devices are connected in parallel to a hydrogen gas supply pipe connecting the water electrolysis stack and the plurality of dehumidification devices and a hydrogen gas discharge pipe discharging moisture-reduced hydrogen gas from the plurality of dehumidification devices and are alternately used to remove moisture from the moisture-containing hydrogen gas, and the hydrogen gas supply pipe and the hydrogen gas discharge pipe are provided with a plurality of inlet valves and outlet valves.

5 Claims, 4 Drawing Sheets

(51) Int. Cl.
*B01D 53/26* (2006.01)
*C25B 1/04* (2021.01)
*C25B 15/021* (2021.01)
*C25B 15/029* (2021.01)

(52) U.S. Cl.
CPC .............. *B01D 53/261* (2013.01); *C25B 1/04* (2013.01); *C25B 15/021* (2021.01); *C25B 15/029* (2021.01); *B01D 2256/16* (2013.01); *B01D 2257/80* (2013.01); *B01D 2259/40086* (2013.01); *B01D 2259/40098* (2013.01); *B01D 2259/402* (2013.01)

(58) Field of Classification Search
CPC .............. C25B 15/083; B01D 53/0438; B01D 53/0446; B01D 53/261; B01D 2256/16; B01D 2257/80; B01D 2259/40086; B01D 2259/40098; B01D 2259/402; B01D 53/0462; Y02E 60/36
See application file for complete search history.

(56) References Cited

FOREIGN PATENT DOCUMENTS

| | | | | |
|---|---|---|---|---|
| JP | 2014185387 | A | * | 10/2014 |
| JP | 2016097388 | A | * | 5/2016 |
| JP | 2019148001 | A | * | 9/2019 |

OTHER PUBLICATIONS

Machine Translation of JP-2008144254-A.*
Machine Translation of JP-2016097388-A.*
Machine Translation of JP-2019148001-A.*

* cited by examiner

METHOD FOR OPERATING WATER ELECTROLYSIS SYSTEM CAPABLE OF STABLY MAINTAINING QUALITY OF HYDROGEN

CROSS-REFERENCE TO RELATED APPLICATION

This application claims priority to and the benefit of Korean Patent Application No. 10-2022-0185310, filed on Dec. 27, 2022, the disclosure of which is incorporated herein by reference in its entirety.

BACKGROUND

1. Field of the Invention

The present invention relates to a method of operating a water electrolysis system capable of stably maintaining the quality of hydrogen.

2. Discussion of Related Art

Recently, as the supply of renewable energy sources, such as solar and wind power, and hydrogen fuel cell vehicles and fuel cells for power generation using hydrogen is expanding and the use of renewable energy sources is increasing and hydrogen is used as an energy carrier in terms of energy storage, the importance of a durable water electrolysis system technology is emerging.

Technologies for producing hydrogen using water electrolysis include acid and alkaline water electrolysis technology, proton exchange membrane (PEM) water electrolysis technology, and anion exchange membrane (AEM) water electrolysis technology.

Among them, the AEM water electrolysis technology has the advantage of enabling miniaturization of equipment compared to PEM water electrolysis, but has the disadvantage of having relatively low hydrogen purity and low equipment and operation stability.

As such, water and various impurities mixed with hydrogen not only lower the purity of hydrogen, but also cause corrosion of various pipes, sensors, or valves placed downstream from the water electrolysis stack.

There is Patent Document 1 describing a technology for purifying hydrogen produced using water electrolysis. Patent Document 1 discloses a hydrogen purification device in a hydrogen production system using water electrolysis including a mixer that receives hydrogen with moisture and performs heat exchange, a first adsorber that receives hydrogen from which some moisture has been removed after cooling through the mixer and completely adsorbs and removes moisture to increase the purity of the hydrogen, a second adsorber that receives some of the hydrogen purified in the first adsorber, lowers the pressure, and desorbs the moisture adsorbed on an adsorbent such that the supplied hydrogen is provided with moisture, an electrochemical hydrogen compressor that compresses hydrogen, which is provided with moisture at low pressure, through the second adsorber at high pressure, a cooler that cools hydrogen compressed at high pressure in the electrochemical hydrogen compressor, and a moisture remover that removes some of the moisture mixed with the hydrogen cooled in the cooler and then supplies the hydrogen to the mixer.

However, in Patent Document 1, the adsorber is heated and hydrogen gas is simultaneously supplied to purge the water vapor therein to restore the adsorption capacity of the adsorbent that has been reduced. This not only results in excessive energy consumption to maintain the temperature of the adsorber but also a problem of hydrogen gas being excessively use to purge water vapor occurs.

SUMMARY OF THE INVENTION

The present invention is directed to providing a water electrolysis system capable of stably maintaining the quality of hydrogen and a method of operating the same.

According to an aspect of the present invention, there is provided a method of operating a water electrolysis system, which includes a water electrolysis stack that discharges moisture-containing hydrogen gas produced by a water electrolysis reaction, a plurality of dehumidification devices including a regenerative adsorbent that removes moisture from the moisture-containing hydrogen gas discharged from the water electrolysis stack, temperature and pressure sensors that detect an internal temperature and pressure of each of the plurality of dehumidification devices, and a heating device that heats the plurality of dehumidification devices, and in which the plurality of dehumidification devices are connected in parallel to a hydrogen gas supply pipe that connects the water electrolysis stack and the plurality of dehumidification devices and a hydrogen gas discharge pipe that discharges moisture-reduced hydrogen gas from the plurality of dehumidification devices and are alternately used to remove moisture from the moisture-containing hydrogen gas, and the hydrogen gas supply pipe and the hydrogen gas discharge pipe are provided with a plurality of inlet valves and outlet valves to control gas to be supplied to and discharged from the plurality of dehumidification devices, wherein the remaining dehumidification device that is not used to remove moisture among the plurality of dehumidification devices is used for regeneration of the regenerative adsorbent, and a process of regenerating the regenerative adsorbent includes a first step of increasing a temperature and pressure inside the dehumidification device by operating the heating device while the inlet valve and the outlet valve are closed, a second step of discharging water vapor from the dehumidification device when the pressure inside the dehumidification device increases to a predetermined level or higher, and a third step of supplying hydrogen gas to the dehumidification device from which the water vapor is discharged and purging the water vapor remaining in the dehumidification device while cooling is performed on the dehumidification device.

In the process of regenerating the regenerative adsorbent, the temperature inside the dehumidification device may be in a range of 300 to 400° C.

The first step and the second step may be repeatedly performed until the pressure increase in the dehumidification device decreases to a predetermined level or lower.

The water electrolysis system may further include a dew point sensor provided at the hydrogen gas discharge pipe to detect a moisture content of the moisture-reduced hydrogen gas, and when the moisture content detected by the dew point sensor increases to a predetermined level or higher, an inlet valve and an outlet valve that are provided at front and rear ends of the dehumidification device used for removing moisture are closed and used for regeneration of the regenerative adsorbent, and the inlet valve and the outlet valve that are provided at the front and rear ends of the dehumidification device used for regeneration of the regenerative adsorbent are opened and used to remove moisture from the moisture-containing hydrogen gas.

The hydrogen gas supplied in the third step is the moisture-containing hydrogen gas discharged from the water electrolysis stack, the hydrogen gas supplied in the third step is supplied through a bypass pipe, which branches off from the hydrogen gas supply pipe at a front end of the inlet valve and is joined with the hydrogen gas supply pipe at a rear end of the inlet valve, and the bypass pipe may be provided with a flow rate control valve that regulates a flow rate of the moisture-containing hydrogen gas supplied to the dehumidification device.

The water vapor discharged in the second step and the water vapor and hydrogen gas discharged in the third step may be discharged to the outside of the water electrolysis system through a water vapor discharge pipe branched off from the hydrogen gas discharge pipe at a front end of the outlet valve.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Prior to the detailed description of the present invention, terms or words used in the specification and claims described below should not be construed as being limited to usual or dictionary meanings and should be interpreted as a meaning and concept consistent with the technical idea of the present disclosure based on the principle that the inventor can appropriately define the concept of terms to explain his/her invention in the best way. The embodiments described in the present specification and the configurations shown in the accompanying drawings are only some of the embodiments of the present disclosure and do not represent all of the technical ideas, aspects, and features of the present disclosure. Accordingly, it should be understood that there may be various equivalents and modifications that can replace or modify the embodiments described herein at the time of filing this application.

Throughout the specification, when a part is said to be “connected” to another part, this includes not only the case where it is “directly connected,” but also the case where it is “indirectly connected” with still another component therebetween.

Throughout the specification, when a part “includes” a certain component, this means that it may further include other components rather than excluding other components, unless specifically stated to the contrary. Additionally, throughout the specification, the singular form also includes the plural form unless otherwise specified.

Hereinafter, exemplary embodiments of the present invention will be described in detail with reference to the accompanying drawings. Detailed descriptions of well-known functions and configurations that may obscure the gist of the present invention have been omitted. For the same reason, in the accompanying drawings, some components are exaggerated, omitted, or schematically shown, and the size of each component does not entirely reflect the actual size.

Figure 1:
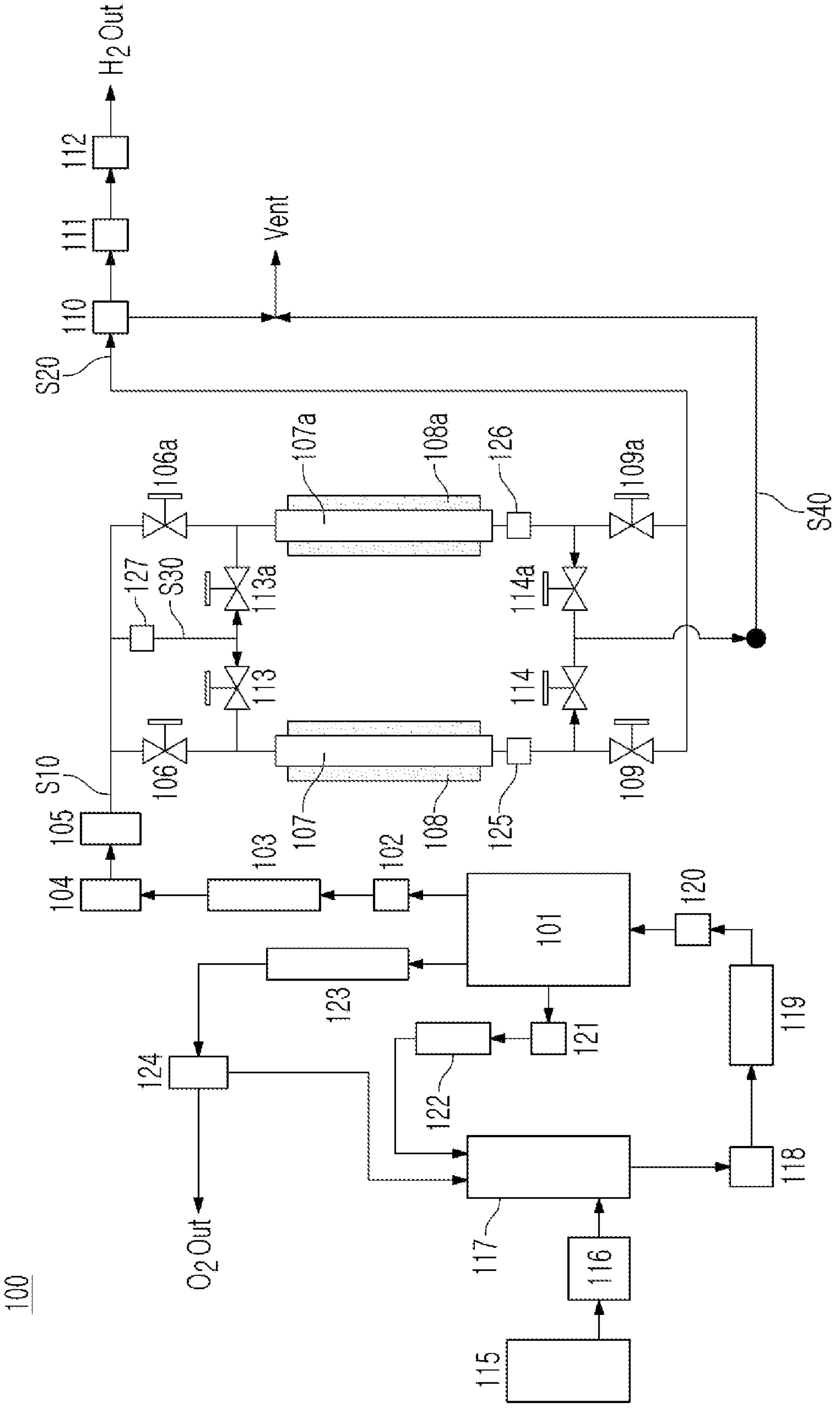
FIG. 1 is a schematic conceptual diagram for explaining a water electrolysis system according to an embodiment of the present invention.

FIG. 1 is a schematic conceptual diagram for explaining a water electrolysis system according to an embodiment of the present invention.

A water electrolysis stack 101 is formed to have a structure in which a plurality of unit cells (membrane electrode assembly) and a separator plate are stacked, and receives external power to electrolyze water so that hydrogen and oxygen are produced.

The unit cell may include an anion exchange membrane, an anode formed in close contact with one side of the anion exchange membrane, and a cathode formed in close contact with the other side of the anion exchange membrane.

At the cathode, electrons supplied from an external power source react with water ($H_2O$) to generate hydrogen gas and OH, as shown in Chemical Equation 1 below, the $OH^-$ may move to the anode through an ion exchange membrane (diaphragm) to generate water ($H_2O$) and oxygen gas as shown in Chemical Equation 2 below.

$$H_2O + 2e^- \longrightarrow 2OH^- + H_2 \quad \text{(Chemical Equation 1)}$$

$$2OH^- \longrightarrow 1/2O_2 + H_2O + 2e^- \quad \text{(Chemical Equation 2)}$$

The separator plate connects two neighboring unit cells in series and supports the two neighboring unit cells firmly. One separator plate may be placed between two neighboring unit cells and is called a bipolar plate. The separator plate may have a channel formed to supply an electrolyte to the unit cell.

The electrolyte may be an alkaline aqueous solution in which salts such as potassium hydroxide (KOH) and potassium carbonate ($K_2CO_3$) are dissolved in deionized water, but is not limited thereto. The alkaline aqueous solution may be supplied to both the cathode and the anode, or only to the anode. In the latter case, dry hydrogen is produced at the cathode.

An electrolyte stored in an electrolyte tank 117 is supplied to the water electrolysis stack 101 by an electrolyte pump 118 and returned to the electrolyte tank 117 through a heat exchanger 122.

The electrolyte supplied by the electrolyte pump 118 may be heated to a temperature suitable for a water electrolysis reaction through a heating device 119 before being supplied to the water electrolysis stack 101, but is not limited thereto.

Temperature and pressure sensors 120 and 121 may be provided between the heating device 119 and the water electrolysis stack 101 and between the water electrolysis stack 101 and the heat exchanger 122, but are not limited thereto.

To replenish water lost by the electrolysis reaction, the electrolyte tank 117 may be supplied with deionized water stored in a deionized water tank 115 by a deionized water pump 116, but is not limited thereto.

Moisture-containing oxygen gas generated at the anode is cooled through a heat exchanger 123 to generate a condensate, and the generated condensate is separated from the oxygen gas at an anode separation tank 124 and may be recovered in the electrolyte tank 117, but is not limited thereto. The oxygen gas separated from the condensate is discharged to the outside of the water electrolysis system 100.

Moisture-containing hydrogen gas generated at the cathode is cooled through a heat exchanger 103 to generate a condensate, and the generated condensate may be separated from the hydrogen gas at a cathode separation tank 104, but is not limited thereto.

A temperature and pressure sensor 102 may be provided between the water electrolysis stack 101 and the heat exchanger 103, but is not limited thereto.

Hydrogen gas from which the condensate has been removed by the cathode separation tank 104 may contain some mixed-in oxygen gas due to leakage from the anode side through the anion exchange membrane to the cathode side during an operation or stop process of the water electrolysis system 100.

A rear end of the cathode separation tank 104 may be provided with a deoxygenation catalytic reactor 105 to remove oxygen mixed in the cathode gas, but is not limited thereto.

Hydrogen gas from which the condensate has been removed is supplied to a plurality of dehumidification devices 107 and 107*a* including a regenerative adsorbent through a hydrogen gas supply pipe S10. Although only two dehumidification devices are shown in FIG. 1, it is not necessarily limited thereto, and in some cases, three or more dehumidification devices may be provided. Hydrogen gas from which residual moisture has been removed by the plurality of dehumidification devices 107 and 107*a* is discharged to the outside of the water electrolysis system 100 through a hydrogen gas discharge pipe S20.

The hydrogen gas supply pipe S10 and the hydrogen gas discharge pipe S20 are provided with a plurality of inlet valves 106 and 106*a* and outlet valves 109 and 109*a* that control the supply and discharge of gas to and from the plurality of dehumidification devices 107 and 107*a*.

The plurality of dehumidification devices 107 and 107*a* may be provided with temperature and pressure sensors 125 and 126 that detect an internal temperature and pressure, and heating devices 108 and 108*a* that heat the inside thereof. The heating device may be a band-type heater provided on the outer peripheral surface of the dehumidification device, but is not limited thereto.

The plurality of dehumidification devices 107 and 107*a* are connected in parallel to the hydrogen gas supply pipe S10 and the hydrogen gas discharge pipe S20 and are alternately used to remove residual moisture in hydrogen gas, and the remaining dehumidification device that is not used to remove residual moisture is used for regeneration of the regenerative adsorbent.

The hydrogen gas discharge pipe S20 may be provided with a dew point sensor 111, which detects a moisture content of the hydrogen gas from which the residual moisture has been removed. When the moisture content detected by the dew point sensor 111 increases to a predetermined level or higher, a specific number of dehumidification devices 107 used for removing the residual moisture in hydrogen gas is closed and transition to a process of regenerating the regenerative adsorbent may occur, and in addition, rest of dehumidification devices 107*a* used in the process of regenerating the regenerative adsorbent is opened and transitions to a process of removing residual moisture from hydrogen gas may occur.

The hydrogen gas discharge pipe S20 may be provided with a pressure regulator 110. When the pressure of the hydrogen gas, from which the residual moisture has been removed, discharged from the specific number of dehumidification devices 107 increases to a predetermined level or higher, by discharging some of the hydrogen gas, from which the residual moisture has been removed, through a water vapor discharge pipe S40, the pressure of the hydrogen gas, from which the residual moisture has been removed, discharged through the hydrogen gas discharge pipe S20 may be maintained in an appropriate range, but is not limited thereto.

The hydrogen gas discharge pipe S20 may be provided with an oxygen concentration sensor 112, and through this, the content of oxygen gas mixed in hydrogen gas may be managed within a predetermined range, thereby stably maintaining hydrogen production quality, but is not limited thereto.

In the process of regenerating the regenerative adsorbent, hydrogen gas is used to purge water vapor, and the hydrogen gas used to purge water vapor may be hydrogen gas from which a condensate has been removed through the cathode separation tank, but is not limited thereto. The hydrogen gas used in the process of regenerating the regenerative adsorbent may be supplied through a bypass pipe S30 which branches off from the hydrogen gas supply pipe S10 at front ends of the inlet valves 106 and 106*a* and is joined with the hydrogen gas supply pipe at rear ends of the inlet valve 106 and 106*a*.

The bypass pipe S30 is provided with a plurality of inlet valves 113 and 113*a* that control the supply of gas to the plurality of dehumidification devices 107 and 107*a*.

The bypass pipe S30 may be additionally provided with a flow rate control valve 127 to regulate a flow rate of gas supplied to the plurality of dehumidification devices 107 and 107*a*, but is not limited thereto. When the flow rate control valve 127 is provided, the amount of hydrogen gas used in the process of regenerating the regenerative adsorbent can be minimized, and stable hydrogen production quality can be maintained.

Hydrogen gas used in the process of regenerating the regenerative adsorbent and water vapor separated from the regenerative adsorbent through the regenerative process may be discharged to the outside of the water electrolysis system 100 through the water vapor discharge pipe S40 branched off from the hydrogen gas discharge pipe S20 at front ends of the outlet valves 109 and 109*a*.

The water vapor discharge pipe S40 is provided with a plurality of outlet valves 114 and 114*a* that control the discharge of gas from the plurality of dehumidification devices 107 and 107*a*.

Figure 2:
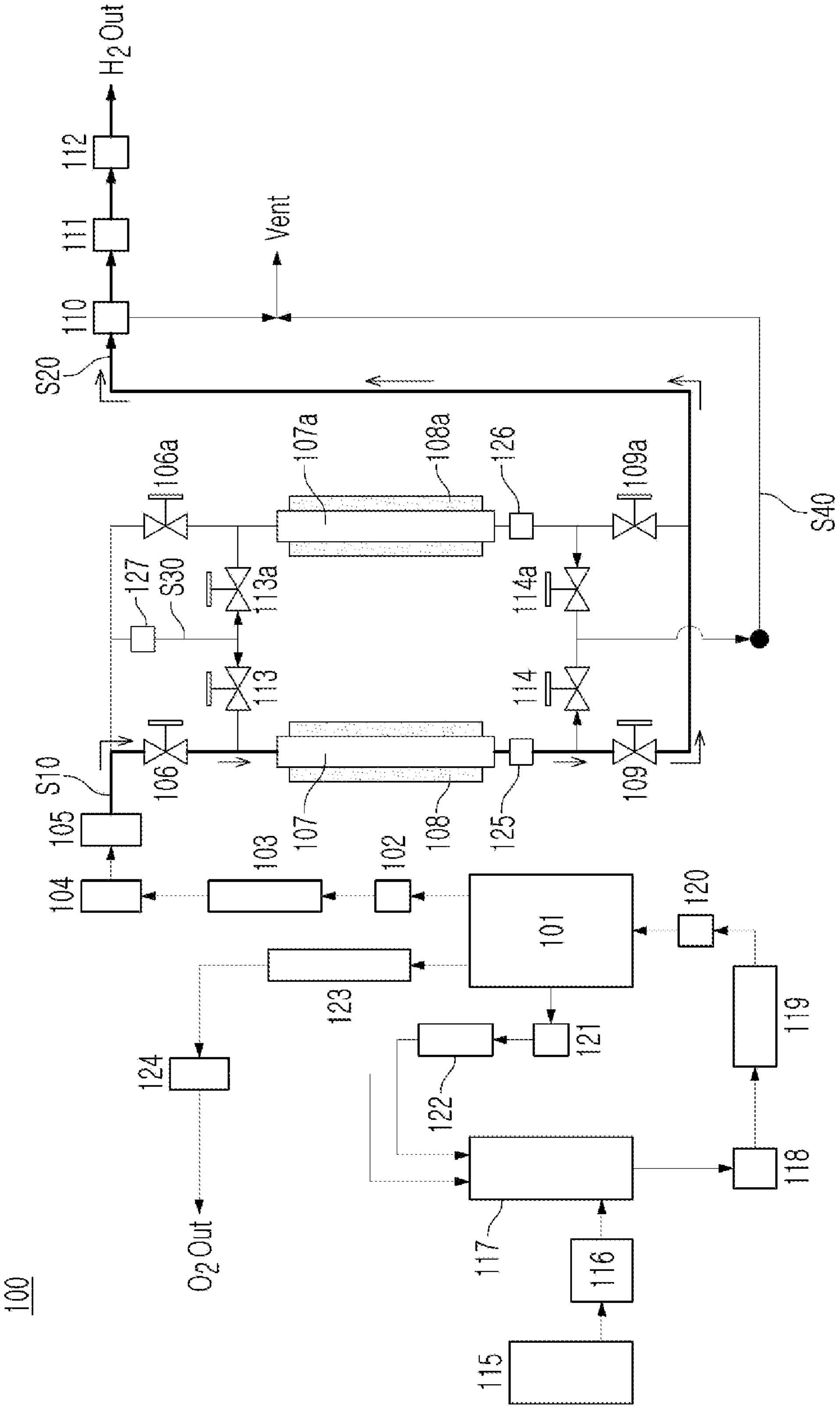
FIG. 2 is a conceptual diagram showing a flow of hydrogen gas used in a residual moisture removal process in a method of operating a water electrolysis system according to an embodiment of the present invention.
Figure 3:
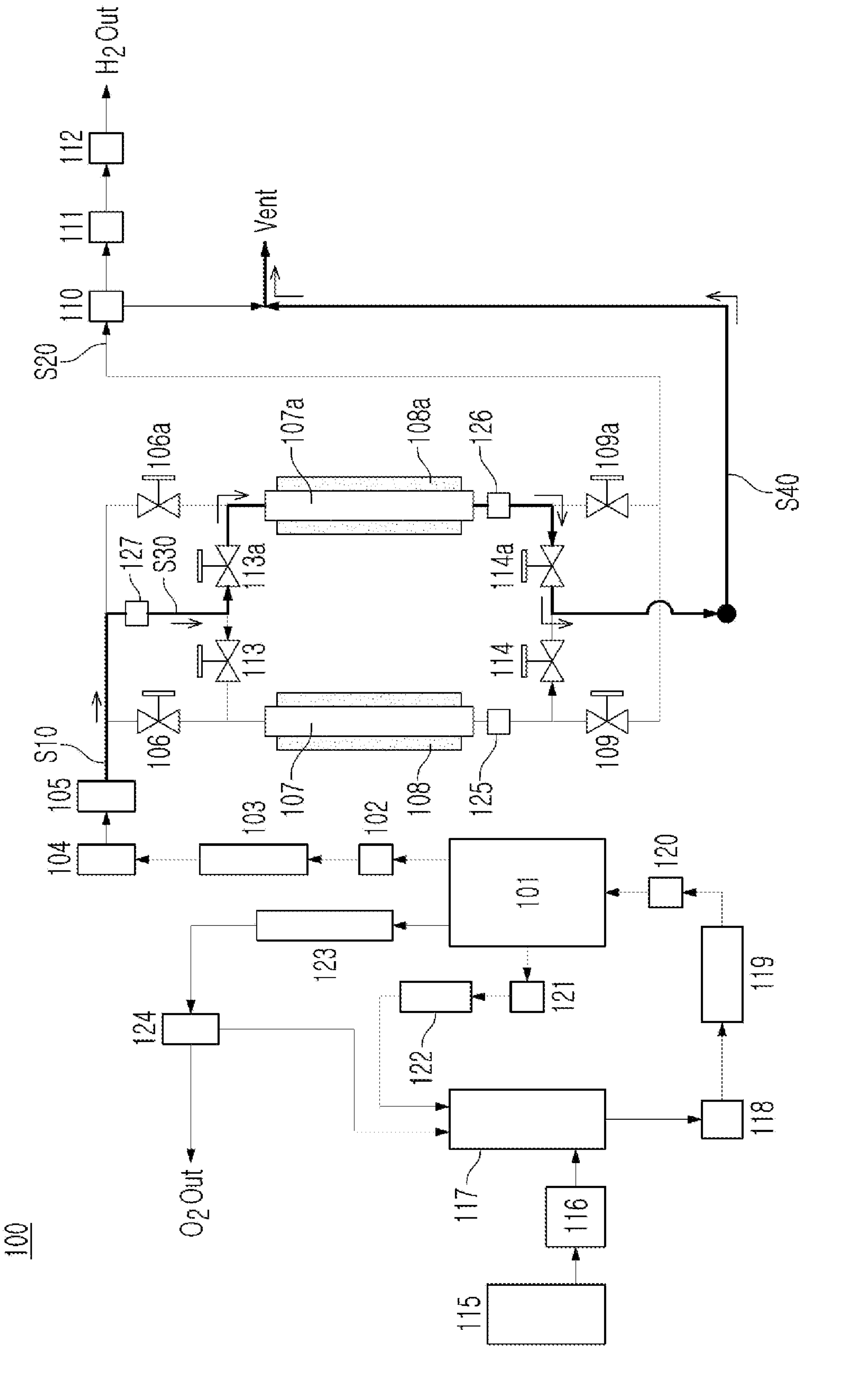
FIG. 3 is a conceptual diagram showing a flow of hydrogen gas used in a process of regenerating a regenerative adsorbent in a method of operating a water electrolysis system according to an embodiment of the present invention.
Figure 4:
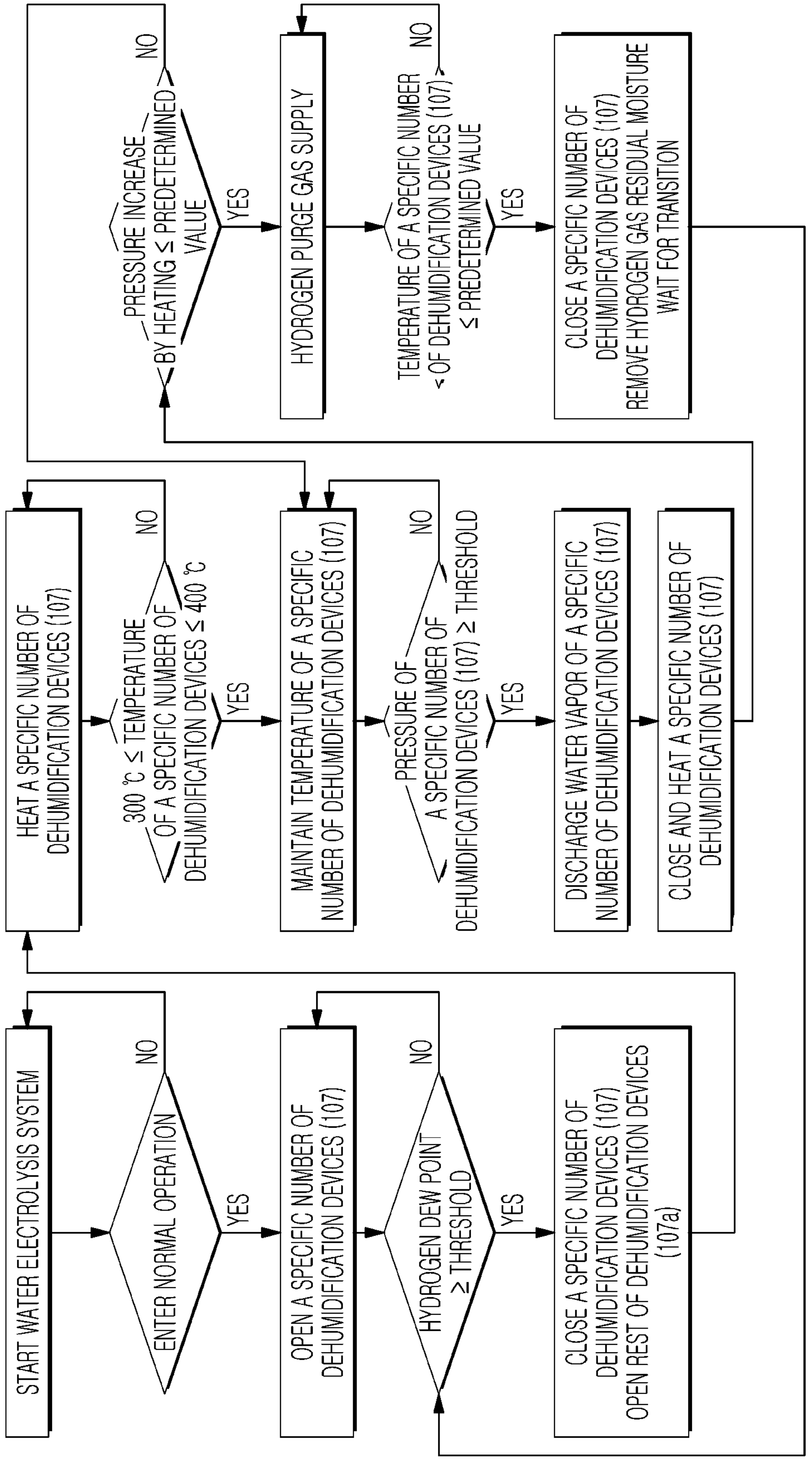
FIG. 4 is a flowchart showing a method of operating a water electrolysis system according to an embodiment of the present invention.

FIG. 2 is a conceptual diagram showing a flow of hydrogen gas used in a residual moisture removal process in the method of operating a water electrolysis system according to an embodiment of the present invention, FIG. 3 is a conceptual diagram showing a flow of hydrogen gas used in a process of regenerating a regenerative adsorbent in a method of operating a water electrolysis system according to an embodiment of the present invention, and FIG. 4 is a flowchart showing a method of operating a water electrolysis system according to an embodiment of the present invention.

When the water electrolysis stack 101 is activated by circulating a high-temperature electrolyte heated by the heating device 119 in the water electrolysis system 100 and the temperature of the water electrolysis stack 101 increases to a predetermined operating temperature, normal operation of the water electrolysis system 100 begins and hydrogen and oxygen are produced.

When the normal operation of the water electrolysis system 100 begins, the inlet valve 106 and the outlet valve 109 of a specific number of dehumidification devices 107 among the plurality of dehumidification devices 107 and 107*a* are opened to proceed with the process of removing residual moisture from hydrogen gas. At this time, the inlet valve 106*a* and the outlet valve 109*a* of rest of dehumidification devices 107*a*, excluding the specific number of dehumidification devices 107 that performs the process of removing residual moisture from hydrogen gas, are closed to wait for the transition to the process of removing residual moisture from hydrogen gas.

Residual moisture in hydrogen gas is removed by the specific number of dehumidification devices 107 until the moisture content detected by the dew point sensor 111 increases to a predetermined level or higher. Here, the predetermined level or higher may mean, for example, 5 ppm or more, which indicates that the regenerative adsorbent is saturated and has reached its use limit.

Thus, when the moisture content detected by the dew point sensor 111 increases to the predetermined level or higher, the dew point sensor 111, the inlet valve 106 and the outlet valve 109 of the front and rear ends of the specific number of dehumidification devices 107 are closed for transition to the process of regenerating the regenerative adsorbent, the inlet valve 106*a* and the outlet valve 109*a* of the front and rear ends of the rest of dehumidification devices 107*a* are closed for transition to the process of removing residual moisture from hydrogen gas.

The heating device 108 in the specific number of dehumidification devices 107 switched to the process of regenerating the regenerative adsorbent is operated to increase the temperature and pressure in the inside thereof. The internal temperature of the specific number of dehumidification devices 107 may be maintained in a range of 300 to 400° C. according to the operation of the heating device 108, but is not limited thereto.

When the pressure inside the specific number of dehumidification devices 107 detected by the temperature and pressure sensor 125 exceeds a predetermined value (e.g., the highest charging pressure or threshold pressure of the dehumidification device), the outlet valve 114 provided on the water vapor discharge pipe S40 is opened to discharge water vapor from the specific number of dehumidification devices 107 by water vapor pressure.

When the discharge of water vapor by water vapor pressure is completed, the outlet valve 114 provided on the water vapor discharge pipe S40 is closed, and the heating device 108 is operated to maintain the internal temperature of the specific number of dehumidification devices 107 in a range of 300 to 400° C.

When the pressure inside the specific number of dehumidification devices 107 detected by the temperature and pressure sensor 125 increases to a predetermined value or more, the outlet valve 114 provided on the water vapor discharge pipe S40 is opened to discharge the water vapor from the specific number of dehumidification devices 107 by water vapor pressure. Once the discharge of water vapor is completed, the outlet valve 114 provided on the water vapor discharge pipe S40 is closed, and the heating device 108 is operated again.

Heating of the specific number of dehumidification devices 107 and discharge of water vapor are repeated several times until the pressure increase due to heating of the specific number of dehumidification devices 107 decreases to a predetermined level or lower.

When the pressure increase due to heating of the dehumidification device decreases to the predetermined level or lower, hydrogen gas is supplied inside the dehumidification device to purge remaining water vapor and cool the specific number of dehumidification devices 107. For this purpose, the inlet valve 113 provided on the bypass pipe S30 and the outlet valve 114 provided on the water vapor discharge pipe S40 are opened.

The supply of hydrogen gas continues until the temperature inside the specific number of dehumidification devices 107 decreases to the predetermined level or lower (e.g., 30° C. or lower), and when the temperature inside the specific number of dehumidification devices 107 reaches the predetermined level or lower, all valves 106, 109, 113, 114 are closed and wait for the transition to the process of removing residual moisture from hydrogen gas.

In the conventional regeneration process, since heating of the dehumidification device and purging by hydrogen are performed simultaneously, low-temperature hydrogen gas inhibits the temperature increase of the dehumidification device and consumes excessive energy to maintain the temperature of the dehumidification device. In addition, there has been a problem of excessively using hydrogen gas to purge water vapor.

In contrast, in a method of operating the water electrolysis system according to an embodiment of the present invention, since the water vapor is discharged through the pressure of the water vapor itself, the temperature of the dehumidification device may be maintained with only a small amount of energy. In addition, since hydrogen gas supplied to the dehumidification device is only used for purging the water vapor inside the dehumidification device and cooling the dehumidification device, hydrogen usage can be significantly reduced.

Also, a method of operating the water electrolysis system according to an embodiment of the present invention uses less hydrogen gas for purging water vapor, and thus can be free from safety problems caused by hydrogen gas emissions even when a capacity of the water electrolysis system is increased.

According to the present invention, since in the regeneration process of regenerative adsorbents, the water vapor is discharged through the pressure of the water vapor, the temperature of the dehumidification device may be maintained with only a small amount of energy. In addition, since hydrogen gas supplied to the dehumidification device is only used for purging the water vapor inside the dehumidification device and cooling the dehumidification device, hydrogen usage can be significantly reduced.

A method of operating the water electrolysis system according to the present invention uses less hydrogen gas for purging water vapor, and thus can be free from safety problems caused by hydrogen gas emissions even when the capacity of the water electrolysis system is increased.

Effects according to aspects of the present invention are not limited to the above-described effects, and it should be understood to include all effects that can be inferred from the configuration described in the detailed description or claims of the specification.

The description of the present specification described above is for illustrative purposes, and those skilled in the art to which one aspect of the present specification pertains will be able to understand that the technical idea or essential features described in the specification can be easily transformed into another specific form without being changed. Therefore, the embodiments described above should be understood in all aspects as illustrative and not restrictive. For example, each component described as a single-type may be implemented in a distributed manner, and similarly, components described as distributed may be implemented in a combined form.

The scope of the present specification is indicated by the claims described below, and all changes or modified forms derived from the meaning and scope of the claims and their equivalent concepts should be construed as being included in the scope of the present specification.

What is claimed is:

1. A method of operating a water electrolysis system, which includes a water electrolysis stack that discharges moisture-containing hydrogen gas produced by a water electrolysis reaction, a plurality of dehumidification devices including a regenerative adsorbent that removes moisture from the moisture-containing hydrogen gas discharged from the water electrolysis stack, temperature and pressure sensors that detect an internal temperature and pressure of each of the plurality of dehumidification devices, and a heating device that heats the plurality of dehumidification devices, and in which the plurality of dehumidification devices are connected in parallel to a hydrogen gas supply pipe that connects the water electrolysis stack and the plurality of dehumidification devices and a hydrogen gas discharge pipe that discharges moisture-reduced hydrogen gas from the plurality of dehumidification devices and are alternately used to remove moisture from the moisture-containing hydrogen gas, and the hydrogen gas supply pipe and the hydrogen gas discharge pipe are provided with a plurality of inlet valves and outlet valves to control gas to be supplied to and discharged from the plurality of dehumidification devices, wherein the remaining dehumidification device that is not used to remove moisture among the plurality of dehumidification devices is used for regeneration of the regenerative adsorbent, and a process of regenerating the regenerative adsorbent includes:

a first step of increasing a temperature and pressure inside the dehumidification device by operating the heating device while the inlet valve and the outlet valve are closed;

a second step of discharging water vapor from the dehumidification device when the pressure inside the dehumidification device increases to a predetermined level or higher; and a third step of supplying hydrogen gas to the dehumidification device from which the water vapor is discharged and purging the water vapor remaining in the dehumidification device while cooling is performed on the dehumidification device, and wherein the hydrogen gas supplied in the third step is the moisture-containing hydrogen gas discharged from the water electrolysis stack, the hydrogen gas supplied in the third step is supplied through a bypass pipe, which branches off from the hydrogen gas supply pipe at a front end of the inlet valve and is joined with the hydrogen gas supply pipe at a rear end of the inlet valve, and the bypass pipe is provided with a flow rate control valve that regulates a flow rate of the moisture-containing hydrogen gas supplied to the dehumidification device.

2. The method of claim 1, wherein, in the process of regenerating the regenerative adsorbent, the temperature inside the dehumidification device is in a range of 300 to 400° C.

3. The method of claim 1, wherein the first step and the second step are repeatedly performed until the pressure increase in the dehumidification device decreases to a predetermined level or lower.

4. The method of claim 1, wherein the water electrolysis system further includes a dew point sensor provided at the hydrogen gas discharge pipe to detect a moisture content of the moisture-reduced hydrogen gas, and when the moisture content detected by the dew point sensor increases to a predetermined level or higher, an inlet valve and an outlet valve that are provided at front and rear ends of the dehumidification device used for removing moisture are closed and used for the regeneration of the regenerative adsorbent, and the inlet valve and the outlet valve that are provided at the front and rear ends of the dehumidification device used for the regeneration of the regenerative adsorbent are opened and used to remove moisture from the moisture-containing hydrogen gas.

5. The method of claim 1, wherein the water vapor discharged in the second step and the water vapor and hydrogen gas discharged in the third step are discharged to the outside of the water electrolysis system through a water vapor discharge pipe branched off from the hydrogen gas discharge pipe at a front end of the outlet valve.

* * * * *